Figure 1:
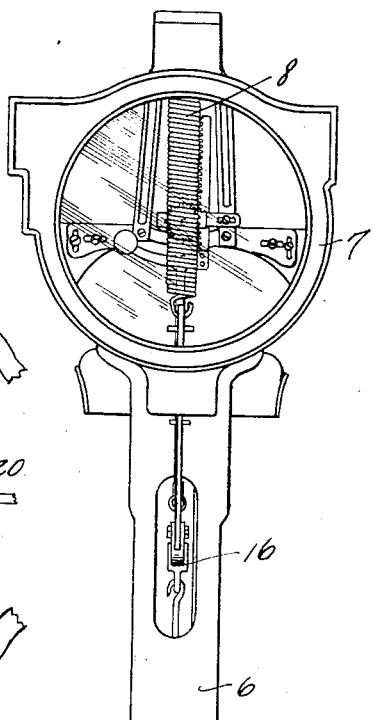

H. O. HEM.
SPRING SCALE.
APPLICATION FILED APR. 2, 1917.

1,404,765.

Patented Jan. 31, 1922.
2 SHEETS—SHEET 1.

INVENTOR.
Halvor O. Hem.
George R. Frye
Atty.

H. O. HEM.
SPRING SCALE.
APPLICATION FILED APR. 2, 1917.
1,404,765.
Patented Jan. 31, 1922.
2 SHEETS—SHEET 2.
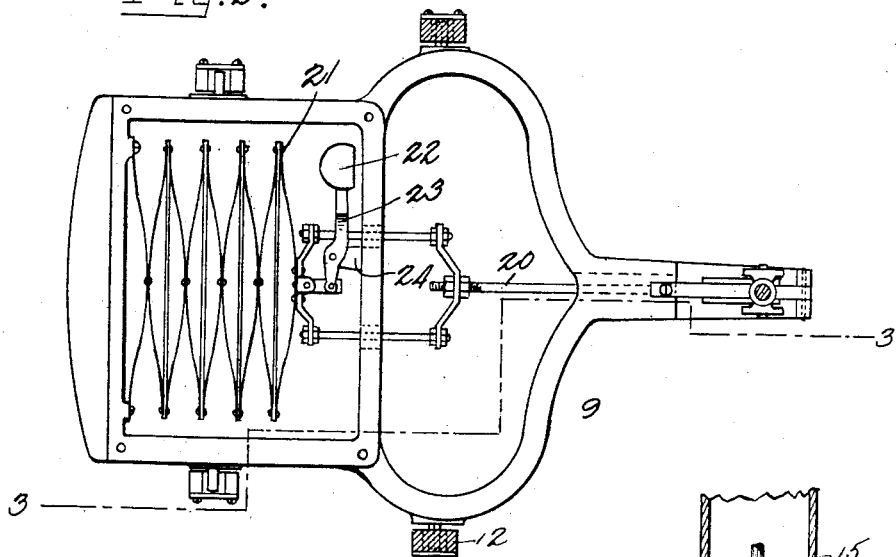
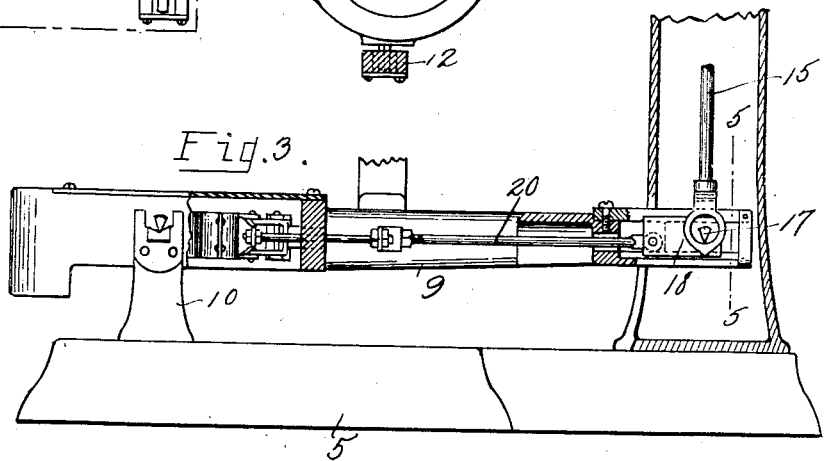
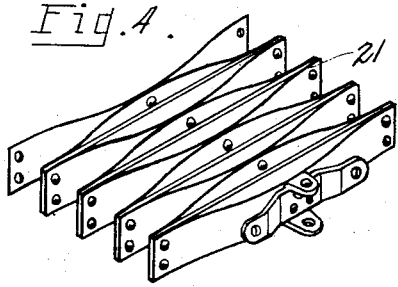
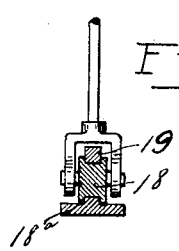
INVENTOR.
Halvor O. Hem.
George R. Frye
Atty.

UNITED STATES PATENT OFFICE.

KALVOR O. HEM, OF TOLEDO, OHIO, ASSIGNOR TO TOLEDO SCALE COMPANY, OF TOLEDO, OHIO, A CORPORATION OF NEW JERSEY.

SPRING SCALE.

1,404,765.     Specification of Letters Patent.     Patented Jan. 31, 1922.

Application filed April 2, 1917. Serial No. 159,168.

*To all whom it may concern:*

Be it known that I, HALVOR O. HEM, a citizen of the United States, residing at Toledo, in the county of Lucas and State of Ohio, have invented certain new and useful Improvements in Spring Scales, of which the following is a specification.

This invention relates to weighing scales and particularly to spring scales having thermostatic devices arranged to compensate for the variation in the load-resisting springs due to changes in temperature.

In certain types of spring scales the thermostat compensating device is carried upon the main lever of the scale and acts to vary the relative distances between the pivots thereof, thereby changing the relation of the two arms of the lever and accordingly varying the pull transmitted to the load-resisting springs. This shifting of the thermostat and controlling mechanism upon the beam, however, effects a serious disadvantage in that the initial weight, or rather distribution of weight of the beam, is likewise changed and causes a different initial pull upon the load-resisting springs for each change in temperature. This is particularly true in scales having the scale beam approximately counterbalanced by the provision of a counterpoise at one side of the fulcrum pivots to offset the weight of the load-receiving platter and its supporting spider, such, for example, as is shown in the accompanying drawings. Such scales usually have the counterpoise of such weight and so spaced from the fulcrum pivots that the effective weight of all material on one side of the fulcrum pivots will not entirely counterbalance the effective weight of the platter, platter supports, adjusting devices, and the material of the lever itself on the other side of the fulcrum pivots, the remainder of this weight being taken up by the load-resisting springs, thus putting the load-resisting springs under an initial tension prior to the placing of any load to be weighed upon the platter. In correcting for the changes in the load-resisting springs due to temperature changes, this initial pull is regarded as a constant; but when the thermostat and controlling devices move upon the beam as the temperature changes, the distribution of weight upon the beam changes relatively to the fulcrum pivots, and the initial weight to be taken up by the load-resisting springs varies accordingly.

The primary object of my invention is to improve thermostatically - controlled spring scales by providing means for counterbalancing the movement of the thermostat on the beam, and thus correcting for the error now existing because of the variable initial pull.

Other objects and advantages will be apparent from the following description taken in connection with the accompanying drawings wherein are shown preferred embodiments of the invention, and wherein similar reference numerals designate similar parts throughout the several views.

In the drawings:—

Figure 6:
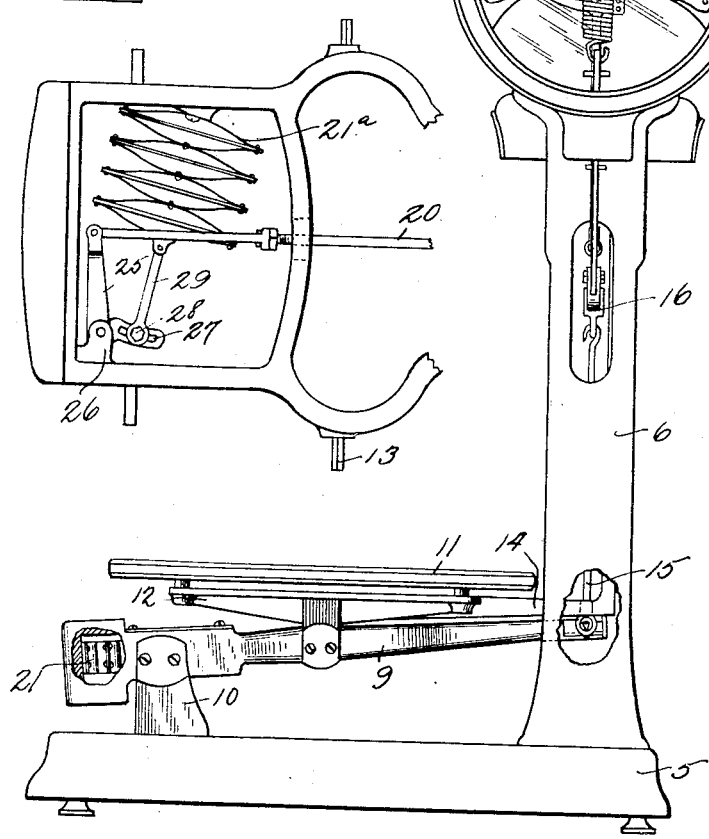

Fig. 1 is a side elevation of a scale equipped with my invention, parts being broken away to show the interior construction; Fig. 2 is a plan view of the main lever or scale beam thereof; Fig. 3 is an enlarged side elevation of the lower portion of the scale, the scale beam being shown in section on the line 3—3 of Fig. 2; Fig. 4 is a detail perspective view of the thermostat; Fig. 5 is a detail sectional view taken on the line 5—5 of Fig. 3; and Fig. 6 is a detail plan view of the scale beam provided with another form of my invention.

In the drawings, the base 5 supports a suitable column 6 upon the upper end of which is mounted a cylindrical housing 7 enclosing the load-resisting springs 8 and the indicating mechanism of the scale, including a cylindrical chart upon which is marked the weight and value graduations in the usual manner of cylinder computing scales. This type of scale has been shown for purposes of illustration inasmuch as it embodies the essential elements of a spring scale requiring a thermostatic correcting device to enable it to approximate accuracy. However, other forms of scales could be as readily employed, and it is to be understood that my invention is adaptable for use in any form of spring scale.

A main lever or scale beam 9 is fulcrumed upon standards 10 carried by the base 5, and supports the platter 11 by means of a spider 12 resting upon upturned pivots 13 upon the scale beam, suitable means, as the check riser 14, being employed to maintain the platter in substantially level position. As shown, one end of the beam extends within the column 6 and connects with the lower end of the steelyard rod 15, the upper end of which engages a cross-bar 16, adapted to connect with the load-resisting springs, preferably arranged adjacent the opposite sides of the cylindrical housing, and the rack bar through which the indicating chart is revolved. As can be seen most clearly in Figs. 2 and 3, the connection with the steelyard rod is made through a pivot 17 mounted in a slidable carrier block 18 arranged upon the scale beam 9, suitable guiding means, such as the grooves 18$^a$ in the block and the rails 19 upon the beam, being provided. Arranged between the carrier block 18 and the thermostat 21 is an adjustable connecting rod 20, which, for purposes of guidance and strength, is preferably divided into two portions adjacent the thermostat, suitable means being provided in the scale beam to guide said portions in their movements.

In operation, when the temperature changes, the load-resisting springs and the thermostat 21 will expand and contract, the expansion or contraction of the thermostat slidably moving the carrier block 18 through the medium of the connecting rod 20, thereby changing the relative distances between the pivots on the main lever to compensate for the changes in the load-resisting springs. However, the shifting of the thermostat, connecting rod and carrier block upon the scale beam will materially change the distribution of weight of the scale beam relatively to the fulcrum pivots, and as hereinbefore explained will change the initial pull upon the load-resisting springs. To overcome this defect, I provide means, such as the weight 22, upon the scale beam arranged to move in the opposite direction to that of the thermostat, carrier block and connecting rod, the arrangement being such that the counter movement of the weight 22 will be sufficient to offset the shifting of mass of the thermostat and associated mechanism. Thus, the weight 22 shown in Fig. 2 is arranged on one arm of the lever 23 and the other arm is pivotally connected with the thermosat 21, the relation of the two arms of the lever 23 being such that the weight 22 multiplied by the distance of its movement will be sufficient to compensate for the shifting of mass of the thermostat and carrier block actuating means multiplied by the distance of its movement.

The initial pull of the scale beam 9 will thereby remain constant despite the shifting of the thermostat and connected means and the movement of the pivot 17 arranged to compensate only for the changes in the load-resisting springs themselves.

In Fig. 6 is shown another form of the correcting device wherein the separate weight may be eliminated, and the connecting rod carrier block and intermediate mechanism may be shifted in opposition to the direction of movement of the thermostat itself so that a balance may be maintained. Thus, the thermostat 21$^a$ is arranged so that its movement will not entirely be longitudinally of the scale beam but is divided into a longitudinal and lateral movement, of which the lateral shifting may be disregarded for the purposes of this application. The longitudinal shifting, however, is much less than in the embodiment shown in Figs. 1–3 inclusive, and may be compensated for by the shifting of the weight of the connecting rod 20$^a$ and the arm 25 forming part of the bell-crank connection between the thermostat and connecting rod. The bell-crank lever 25 is pivoted upon an arm 26 carried upon the scale beam, and one arm is arranged with an elongated slot 27 in which is secured the bolt 28 through which connection is made with the rod 29 engaging the thermostat, thereby permitting adjustment to regulate the movements of the thermostat in accordance with the movements of the connecting rod and associated devices.

While it will be apparent that the illustrated embodiments of my invention herein disclosed are well calculated to adequately fulfill the objects and advantages primarily stated, it is to be understood that the invention is susceptible to variation, modification and change without departing from the spirit and scope of the invention as set forth in the subjoined claims.

Having described my invention, I claim:

1. In a spring scale having a lever, a thermostat carried by the lever, and weighted counterbalance means adapted to be moved in opposite direction to the expansive and contractive movements of the thermostat a sufficient distance to compensate for the change of the center of gravity of the lever due to the movements of the thermostat.

2. In a spring scale having a lever, a thermostat carried by the lever, and weighted counterbalance means connected with the thermostat and adapted to be moved in opposite direction to the expansive and contractive movements of the thermostat a sufficient distance to compensate for the change of the center of gravity of the lever due to the movements of the thermostat.

3. In a spring scale, a lever having pivots, one of which is movable, a thermostat carried by the lever, and means actuated by the thermostat whereby the pivot is moved in accordance with variations in temperature, said means and thermostat being arranged to conjointly operate to maintain constant the effective weight of the lever.

4. In a spring scale, a lever having pivots, one of which is movable, a thermostat carried by the lever, actuating means moved by the thermostat whereby the pivot is moved in accordance with variations in temperature, and counterbalance means moved by the thermostat to correct for the shifting of weight of the actuating means.

5. In a spring scale, load-resisting springs, a lever having a pivot, connections between the pivot and springs, a thermostat carried by the lever, connections intermediate the thermostat and pivot whereby the pivot is moved longitudinally of the lever in accordance with variations in temperature, said connections and thermostat being arranged to conjointly operate to maintain constant the initial pull of the lever on the springs.

6. In a spring scale, load-resisting springs, a lever having a pivot, connections between the pivot and springs, a thermostat carried by the lever, connections intermediate the thermostat and pivot whereby the pivot is moved longitudinally of the lever in accordance with variations in temperature, and counterbalance means mounted upon the lever and arranged to be moved to correct for the shifting of weight of the thermostat and pivot actuating means.

7. In a spring scale, load-resisting springs, a lever having a pivot, connections between the pivot and springs, a thermostat carried by the lever, connections intermediate the thermostat and pivot whereby the pivot is moved, and a counterbalance weight mounted upon the lever and adapted to be moved to correct for the shifting of weight of the thermostat and pivot actuating means.

8. In a spring scale, load-resisting springs, a lever having a pivot, connections between the pivot and springs, a thermostat carried by the lever, connections intermediate the thermostat and pivot whereby the pivot is moved, a counterbalance weight mounted upon the lever and adapted to be moved to correct for the shifting of weight of the thermostat and pivot actuating means, a lever upon which said weight is mounted, and means for pivotally connecting the lever with the thermostat.

9. In a spring scale, a scale beam, a thermostat carried thereby, and counterbalance means connected with the thermostat and arranged to compensate for the movements of the mass of the thermostat and vary the initial pull on the springs in conformity with changes in temperature whereby the scale will be maintained in balance at the zero indication.

10. In a spring scale, a scale beam, a thermostat carried thereby, and a counterbalance means arranged to be moved by the thermostat to vary the initial pull of the scale beam in conformity with changes in temperature whereby the scale will be maintained in balance at the zero indication.

11. In a spring scale, in combination, a lever, a thermostat, means controlled by said thermostat for changing the relative lengths of the lever arms and arranged to position the center of mass of said lever to maintain the scale in balance at its zero position as the lengths of said lever arms are changed.

12. In a scale having a lever, means for shifting a pivot of said lever to change the relative lengths of the lever arms, and means controlled by said pivot shifting means for positioning the center mass of said lever to maintain the scale in balance.

13. In a scale having a lever, a thermostat for shifting a pivot of said lever to change the relative lengths of the lever arms, and means controlled by said thermostat for positioning the center of mass of said lever to maintain the scale in balance.

14. In a weighing scale having a lever, the combination of a thermostat, means operated by said thermostat for changing the relative lengths of the lever arms as the temperature changes, and means whereby the center of mass of the lever is positioned by the operation of said thermostat to maintain the scale in balance.

15. In a spring scale, in combination, a spring, a lever so connected to said spring as to place it in slight tension when the scale is in zero position, a thermostat, means operated by said thermostat to change the relative lengths of the arms of said lever, and means controlled by said thermostat to maintain the initial tension on said spring substantially constant throughout the range of change in the relative lengths of the lever arms.

16. In a scale, in combination, a lever, thermostatic means for changing the relative lengths of the lever arms and simultaneously positioning the center of mass of the lever so as to maintain the scale in balance.

HALVOR O. HEM.

Witnesses:
C. H. MILLER, Jr.,
R. HECKLER.